US010739979B2

(12) United States Patent
Truelove et al.

(10) Patent No.: US 10,739,979 B2
(45) Date of Patent: Aug. 11, 2020

(54) HISTOGRAM SLIDER FOR QUICK NAVIGATION OF A TIME-BASED LIST

(71) Applicant: Microsoft Technology Licensing, LLC, Redmond, WA (US)

(72) Inventors: Benjamin N. Truelove, Lynnwood, WA (US); Zi Gu, Sammamish, WA (US); Naresh Kannan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/036,636

(22) Filed: Jul. 16, 2018

(65) Prior Publication Data

US 2020/0019303 A1    Jan. 16, 2020

(51) Int. Cl.
*G06F 3/0485* (2013.01)
*G06F 3/0482* (2013.01)

(52) U.S. Cl.
CPC ........ *G06F 3/04855* (2013.01); *G06F 3/0482* (2013.01)

(58) Field of Classification Search
CPC ........................... G06F 3/04855; G06F 3/0482
See application file for complete search history.

(56) References Cited

U.S. PATENT DOCUMENTS

| | | | |
|---|---|---|---|
| 7,607,169 B1 | 10/2009 | Njemanze et al. | |
| 8,245,301 B2 | 8/2012 | Evans et al. | |
| 8,931,107 B1 * | 1/2015 | Brandwine | ......... G06F 11/1451 726/26 |
| 9,514,309 B1 | 12/2016 | Mann | |
| 9,680,845 B2 | 6/2017 | Langton et al. | |
| 9,792,436 B1 | 10/2017 | Sankruthi | |
| 10,447,546 B1 * | 10/2019 | Guo | ........................ H04L 41/22 |
| 2009/0002370 A1 | 1/2009 | Helfman | |

(Continued)

FOREIGN PATENT DOCUMENTS

| | | | |
|---|---|---|---|
| CN | 105122216 A | 12/2015 | |
| WO | WO-2016004063 A1 * | 1/2016 | ........... G06F 9/5066 |
| WO | 2017053745 A1 | 3/2017 | |

OTHER PUBLICATIONS

"Eset vs. Crypto-ransomware", In White Paper of ESET, Retrieved on: Feb. 7, 2018, 9 Pages.

(Continued)

*Primary Examiner* — Scott T Baderman
*Assistant Examiner* — Seung Woon Jung
(74) *Attorney, Agent, or Firm* — Schwegman Lundberg & Woessner, P.A.

(57) ABSTRACT

A histogram slider application accesses, from a data storage of a machine, file activities performed on the machine as a function of time. The histogram slider application determines points in time at which a level of file activities exceeds an activity level threshold that is based on historical levels of file activities on the machine. The histogram slider application generates a graphical user interface comprising a histogram indicative of the file activities over time and the determined points in time, a slider configured to move along a timeline that is parallel to the histogram, and a list of file activities corresponding to a first position of the slider on the timeline, the first position indicating a first time on the histogram.

18 Claims, 10 Drawing Sheets

(56) References Cited

U.S. PATENT DOCUMENTS

| | | | |
|---|---|---|---|
| 2009/0144410 A1 | 6/2009 | Fink et al. | |
| 2011/0067106 A1* | 3/2011 | Evans | G06F 21/552 |
| | | | 726/23 |
| 2011/0082838 A1 | 4/2011 | Niemela | |
| 2011/0231291 A1 | 9/2011 | Yankovich et al. | |
| 2011/0261049 A1* | 10/2011 | Cardno | G06Q 10/10 |
| | | | 345/419 |
| 2012/0137238 A1* | 5/2012 | Abeln | G06F 3/04847 |
| | | | 715/771 |
| 2013/0086683 A1 | 4/2013 | Thomas et al. | |
| 2013/0125051 A1* | 5/2013 | Kelley | G06F 16/11 |
| | | | 715/810 |
| 2014/0095428 A1* | 4/2014 | Beresniewicz | G06F 11/321 |
| | | | 707/609 |
| 2016/0041778 A1* | 2/2016 | Li | G06F 3/061 |
| | | | 711/114 |
| 2017/0141975 A1 | 5/2017 | John et al. | |
| 2017/0206353 A1 | 7/2017 | Jai et al. | |
| 2017/0270293 A1 | 9/2017 | Gu et al. | |
| 2017/0329965 A1 | 11/2017 | Dodson | |
| 2017/0337194 A1* | 11/2017 | Gilchrist | G06F 3/0482 |
| 2018/0007069 A1 | 1/2018 | Hunt et al. | |
| 2018/0018458 A1 | 1/2018 | Schmugar et al. | |
| 2018/0034835 A1 | 2/2018 | Iwanir et al. | |
| 2018/0307839 A1* | 10/2018 | Bhave | G06F 21/56 |
| 2019/0068627 A1* | 2/2019 | Thampy | G06N 20/00 |
| 2019/0303571 A1 | 10/2019 | Chelarescu et al. | |

OTHER PUBLICATIONS

"International Search Report and Written Opinion Issued in PCT Application No. PCT/US2019/023776", dated May 14, 2019, 13 Pages.

Schmidt, Ricardo, "Tracking suspicious activity on AWS", Retrieved From https://amaysim.engineering/tracking-suspicious-activity-on-aws-299a943f3e23, Retrieved on: May 22, 2018, 16 Pages.

* cited by examiner

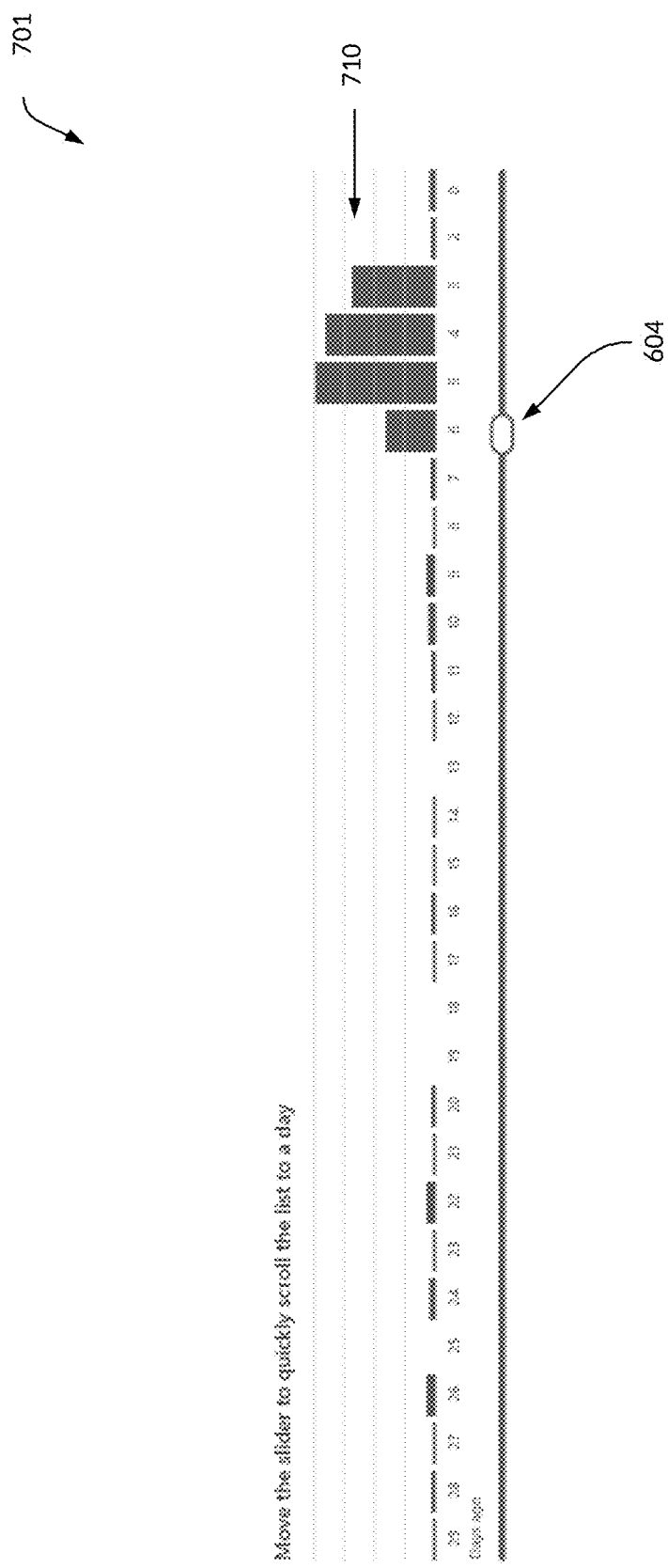

HISTOGRAM SLIDER FOR QUICK NAVIGATION OF A TIME-BASED LIST

TECHNICAL FIELD

The subject matter disclosed herein generally relates to a special-purpose machine that generates a graphical user interface for quick navigation of a time-based list. Specifically, the present disclosure addresses systems and methods for generating a graphical user interface having a histogram slider.

BACKGROUND

In the course of the life of a set of files, thousands of actions can be performed on the files (e.g., edit, rename, etc.). However, some actions may be destructive (e.g., accidental mass delete, bulk edit of many files, or even ransomware attacks). When such actions occur, it is difficult for the user to quickly navigate through a list of thousands of actions to examine the actions on the files.

BRIEF DESCRIPTION OF THE DRAWINGS

Some embodiments are illustrated by way of example and not limitation in the figures of the accompanying drawings.

FIG. 7B is an example graphical user interface (GUI) of an updated histogram slider and activities chart, in accordance with an example embodiment.

DETAILED DESCRIPTION

Figure 1:
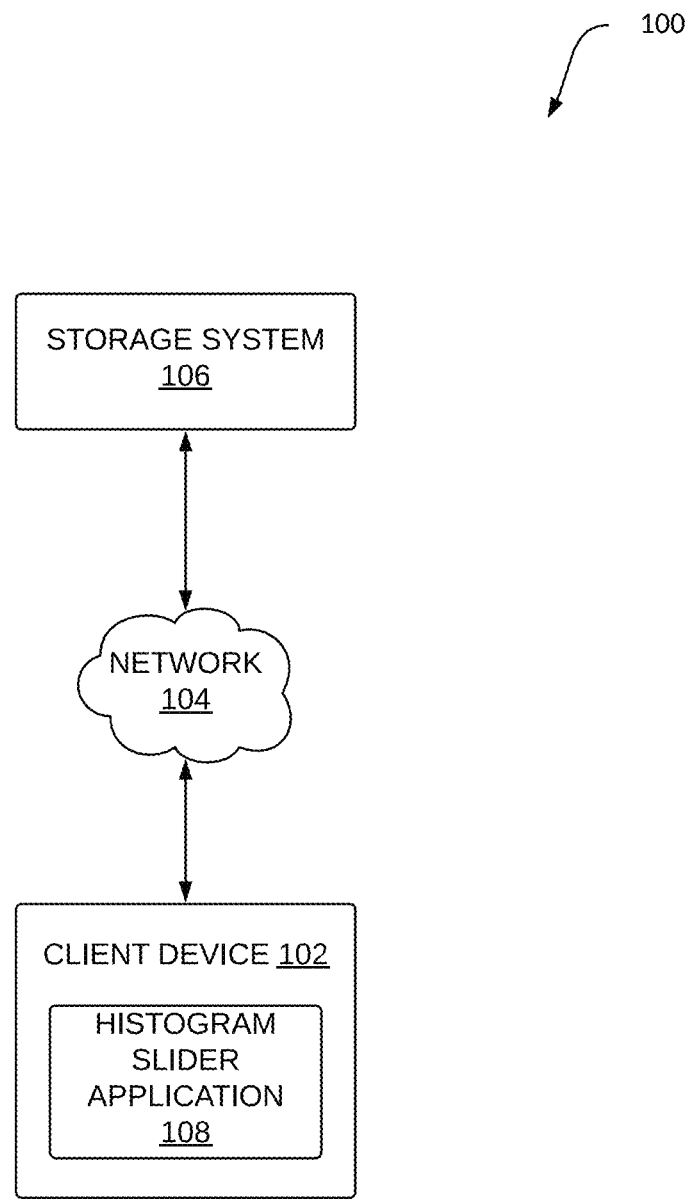
FIG. 1 is a block diagram illustrating an example environment for a histogram slider application, in accordance with an example embodiment.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) detect and identify suspicious file activities of files stored in a machine or a cloud storage system and provide a graphical user interface that enables the user of the machine to quickly navigate through a timeline to identify suspicious activities and to operate on the files corresponding to the suspicious activities. In the course of the life of a set of files, thousands or even millions of actions can be done (e.g., written, editing, copying, deleting). There are times when actions are destructive, such as an accidental mass delete, a bulk edit of many files, or even ransomware attacks. When this happens, it may be difficult for a user to undo these actions up to a point in the past before they occurred because the list of actions could incorporate tens of thousands of actions. It could be difficult to find the point in time that the user desires to go to in order to roll back all subsequent changes.

The present disclosure describes a graphical user interface (GUI) that enables the user to quickly move to a day, and then peruse the hundreds or even thousands of actions that happened then. Additionally, the GUI displays the amount of activity in a day and enables the user to select a day.

In one example embodiment, the GUI allows for users to quickly navigate through the many actions by forming a day scale with a bar chart of daily activity associated with it, and a list of individual actions below the bar chart. By moving a slider left or right along a bar or timeline, the user navigates to a day and simultaneously scrolls the list to the range of actions that start that day. The user can then move the scroll position to find the exact action that the user desires to select.

In accordance with example embodiments, a histogram slider application accesses, from a data storage of a machine, file activities performed on the machine as a function of time. The histogram slider application determines points in time at which a level of file activities exceeds an activity level threshold that is based on historical levels of file activities on the machine. The histogram slider application generates a graphical user interface comprising a histogram indicative of the file activities over time and the determined points in time, a slider configured to move along a timeline that is parallel to the histogram, and a list of file activities corresponding to a first position of the slider on the timeline, the first position indicating a first time on the histogram.

As a result, one or more of the methodologies described herein facilitate solving the technical problem of identifying which files are associated with suspicious activities, generating a graphical user interface identifying the suspicious activities in a timeline, enabling the user to scroll or navigate through the timeline, and updating a list of file activities corresponding to a position on the timeline. As such, one or more of the methodologies described herein may obviate a need for certain efforts or computing resources that otherwise would be involved in generating an entire list of file activities and enabling the user to comb through the entire list to identify suspicious file activities. As a result, resources used by one or more machines, databases, or devices (e.g., within an environment) may be reduced because a specific limited number of file activities corresponding to a day selected by the user are identified. Examples of such computing resources include processor cycles, network traffic, memory usage, data storage capacity, power consumption, network bandwidth, and cooling capacity.

FIG. 1 is a block diagram illustrating an example environment 100 for a histogram slider application, in accordance with an example embodiment. In example embodiments, a storage system 106 stores copies of files from a client device 102.

The storage system 106 is coupled, via a network 104, to one or more client devices (e.g., client device 102). One or more portions of the network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The client device 102 includes a histogram slider application 108 configured to access file activities of files stored on the client device 102 or at the storage system 106. For example, the histogram slider application 108 communicates with a client storage application (not shown) that synchronizes local files stored in a preset directory or folder at the client device 102 with a corresponding directory or folder at the storage system 106. Therefore, changes made to a local file in the preset folder of the client device 102 are propagated to a corresponding remote file (a copy of the local file) in the storage system 106. In one example, the histogram slider application 108 registers the client device 102 with the storage system 106 and communicates copies of the user-selected local files at the client device 102 to the storage system 106. In another example, changes made to a remote file at the storage system 106 are propagated to a corresponding local file in the client device 102.

In one example embodiment, the histogram slider application 108 detects suspicious activities based on a level of file activities at the client device 102 (e.g., the level of file activities can indicate malware or ransomware activity). In another example embodiment, the storage system 106 detects suspicious activities based on a level of file activities in a directory (associated with the client device 102) at the storage system 106. The storage system 106 provides the client device 102 with pertinent information such as the file name, the user who modified the file, the device that modified the file, the application that modified the file, the time of the modification, and whether the file is shared with other client devices.

The histogram slider application 108 generates a graphical user interface that displays a list of file activities based on a selected date on a timeline. The timeline is correlated to a histogram to indicate a level of file activities for each date on the timeline. The histogram slider application 108 enables the user of the client device 102 to navigate across the timeline and display the file activities based on a selected date. Furthermore, the histogram slider application 108 presents the user with options of operations (e.g., delete, restore) to perform on the files identified in the file activities based on the selected date.

The client device 102 comprises, but is not limited to, a smartphone, tablet, laptop, multi-processor system, microprocessor-based or programmable consumer electronics system, game console, set-top box, or any other device that a user utilizes to communicate over the network 104. In example embodiments, the client device 102 comprises a display module (not shown) to display information (e.g., in the form of specially configured user interfaces). In some embodiments, the client device 102 may comprise one or more of a touch screen, camera, keyboard, microphone, and Global Positioning System (GPS) device.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 8, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the systems or machines illustrated in FIG. 1 may be combined into a single system or machine, and the functions described herein for any single system or machine may be subdivided among multiple systems or machines. Additionally, any number and type of client devices 102 may be embodied within the environment 100. Furthermore, some components or functions of the environment 100 may be combined or located elsewhere in the environment 100. For example, some of the functions of the histogram slider application 108 may be embodied at the storage system 106.

Figure 2:
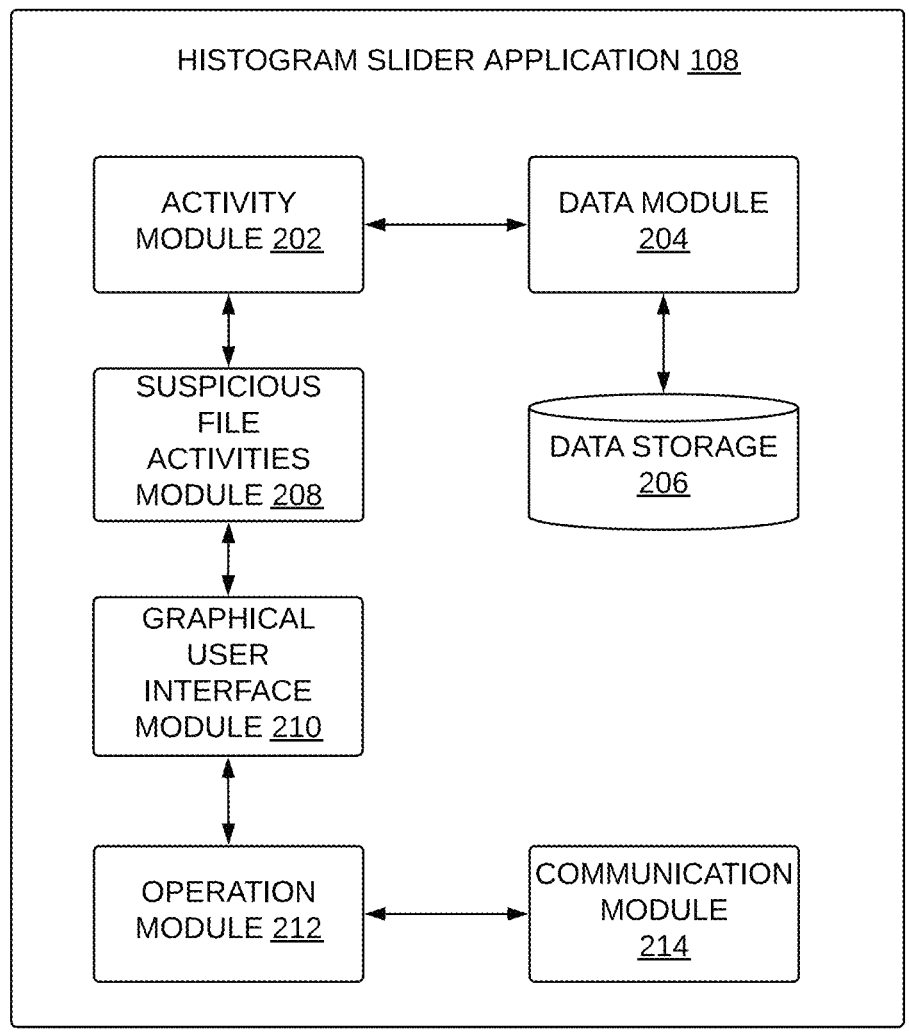
FIG. 2 is a block diagram illustrating components within a histogram slider application, in accordance with an example embodiment.

FIG. 2 is a block diagram illustrating components within a histogram slider application 108, in accordance with an example embodiment. In example embodiments, the histogram slider application 108 performs operations to detect and identify file activities of files stored at the client device 102 or at the storage system 106, generate a GUI to provide a histogram of file activities by date, receive a selection of a date, and provide a list of file activities corresponding to the selected date. To enable these operations, the histogram slider application 108 comprises an activity module 202, data module 204, a data storage 206, a suspicious file activities module 208, a graphical user interface (GUI) module 210, an operation module 212, and a communication module 214, all of which are configured to communicate with each other (e.g., over a bus, shared memory, or a switch), in accordance with an example embodiment.

The activity module 202 is configured to interface and communicate with the data storage 206 via the data module 204. The activity module 202 accesses file activities of files stored at the data storage 206. In another example embodiment, the activity module 202 is configured to access file activities of files stored at the storage system 106 via the communication module 214.

The data storage 206 stores the files and activities of the files (e.g., file deleted, modified, etc.). In one example embodiment, the data storage 206 stores a version of a file before or after an activity on the file. Therefore, the data storage 206 stores several versions of the files based on the dates and times of the different versions of the files. The files stored in the data storage 206 may be copies of files stored at the storage system 106. The files may include attributes such as file name, file extension, and size. Those of ordinary skill in the art will recognize that the files can include other different types of attributes.

The data module 204 identifies the file activities corresponding to each file stored in the data storage 206. The data module 204 provides information identifying the file activities, the corresponding files, and the corresponding dates to the activity module 202. The activity module 202 determines the file activities, the corresponding files, and the corresponding dates. Furthermore, the activity module 202 generates or updates a list of file activities corresponding to a date selected by the user.

The suspicious file activities module 208 determines a threshold level of file activities based on the historical file activities of files in the data storage 206. For example, the suspicious file activities module 208 computes an average level of file activities based on the last 30 days. The average level of file activities is used as a threshold level. In other example embodiments, the suspicious file activities module 208 determines the threshold level based on other parameters (e.g., who modified the files, what time the modifications were made, pattern of file modifications, etc.). In another example embodiment, the suspicious file activities module 208 identifies dates with suspicious activities.

The GUI module 210 generates a histogram based on a level of the file activities on the corresponding dates as obtained by the activity module 202. Furthermore, the histogram may identify dates with suspicious file activities. The GUI module 210 further generates a slider configured to slide across a timeline under the histogram. The GUI module 210 enables the user to slide the slider to identify a date on the histogram. The GUI module 210 displays a list of file activities based on the date selected by the slider. Therefore, the user can quickly navigate in a chronological order to identify file activities using the slider on the GUI. Furthermore, the GUI module 210 updates the list of file activities based on the date selected by the user using the slider.

In another example embodiment, the GUI module 210 enables the user to select one or more items from the list of file activities to operate on. For example, the user selects an item (e.g., file A modified by user B) to revert back to a version prior to the file activity (e.g., version of file A prior to modification by user B). The operation module 212 operates on the selected item (e.g., delete selected files).

The communication module 214 is configured to exchange communications with the storage system 106. For example, the communication module 214 transmits the operations performed by the operation module 212.

Any one or more of the components (e.g., modules, engines) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that component. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The histogram slider application 108 may comprise other components not pertinent to example embodiments that are not shown or discussed. Further still, one or more of the components of the histogram slider application 108 may be located at the storage system 106.

Figure 3:
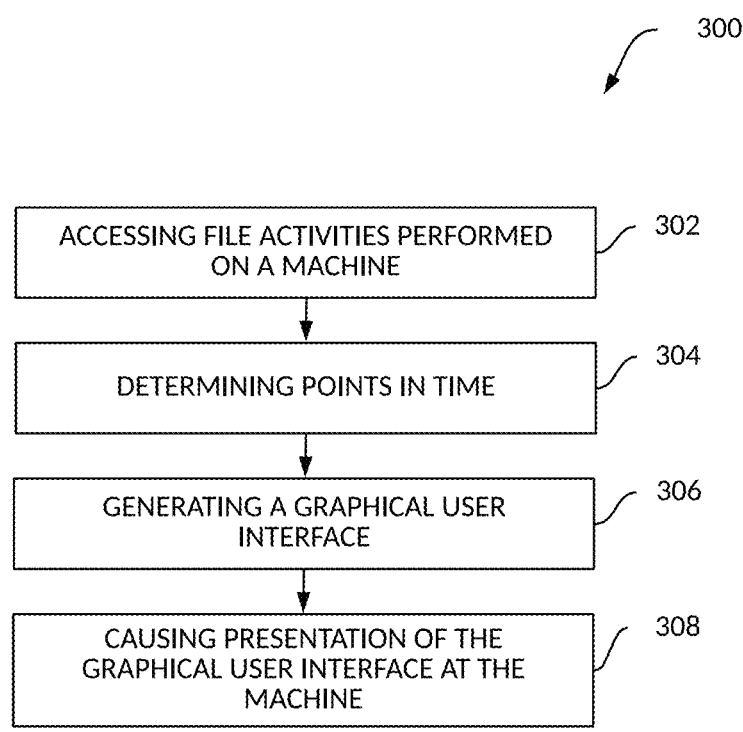
FIG. 3 is a flow diagram of a method for generating a histogram slider, in accordance with an example embodiment.

FIG. 3 is a flow diagram of a method 300 for generating a histogram slider, in accordance with an example embodiment. Operations in the method 300 may be performed by the histogram slider application 108, using components (e.g., modules, engines) described above with respect to FIG. 2. Accordingly, the method 300 is described by way of example with reference to the histogram slider application 108. However, it shall be appreciated that at least some of the operations of the method 300 may be deployed on various other hardware configurations or be performed by similar components residing elsewhere. For example, some of the operations may be performed at the storage system 106.

In operation 302, the activity module 202 accesses file activities performed on the client device 102. In example embodiments, the activity module 202 identifies file activities, and corresponding files and files attributes (e.g., date of change, time of change, author who requested the change), via the data module 204.

In operation 304, the suspicious file activities module 208 determines points in time of suspicious activities. For example, the suspicious file activities module 208 identifies dates with levels of file activities exceeding a level threshold. The level threshold may be determined relative to historical file activities. For example, the level threshold can be computed as the average or mean number of file activities per day within the last 30 days. In another example embodiment, the suspicious file activities module 208 examines the pattern of the file activities to identify dates with suspicious file activities. For example, the suspicious file activities module 208 detects that file activities on Saturday are suspicious relative to the level of file activities from other days.

In another example embodiment, operation 304 may be performed by any other activity-based monitoring application. Other types of monitoring can be used to identify points of interest on the histogram. Examples of other types of monitoring may include storage activity, usage activity, power consumption activity, or any other types of activities performed on the client device 102 or on another machine.

In operation 306, the GUI module 210 generates a GUI comprising a histogram of file activities by date, a slider on a timeline, and a list of file activities based on a date selected by the slider.

In operation 308, the GUI module 210 causes a presentation of the GUI at the client device 102.

Figure 4:
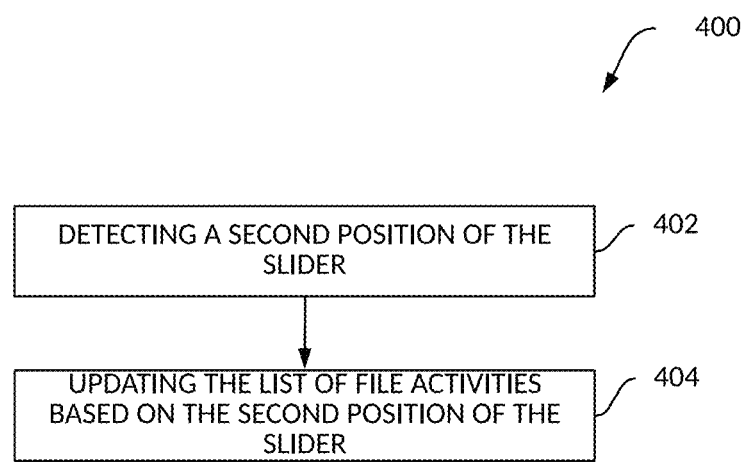
FIG. 4 is a flow diagram of a method for updating a histogram slider, in accordance with another example embodiment.

FIG. 4 is a flow diagram of a method 400 for updating a histogram slider, in accordance with another example embodiment. Operations in the method 400 may be performed by the histogram slider application 108, using components (e.g., modules, engines) described above with respect to FIG. 2. Accordingly, the method 400 is described by way of example with reference to the histogram slider application 108. However, it shall be appreciated that at least some of the operations of the method 400X) may be deployed on various other hardware configurations or be performed by similar components residing elsewhere. For example, some of the operations may be performed at the storage system 106.

In operation 402, the GUI module 210 detects another position (e.g., a second position) of the slider on the timeline. The GUI module 210 determines the date corresponding to the second position of the slider relative to the histogram. In operation 404, the GUI module 210 updates the list of file activities based on the date corresponding to the second position of the slider.

Figure 5:
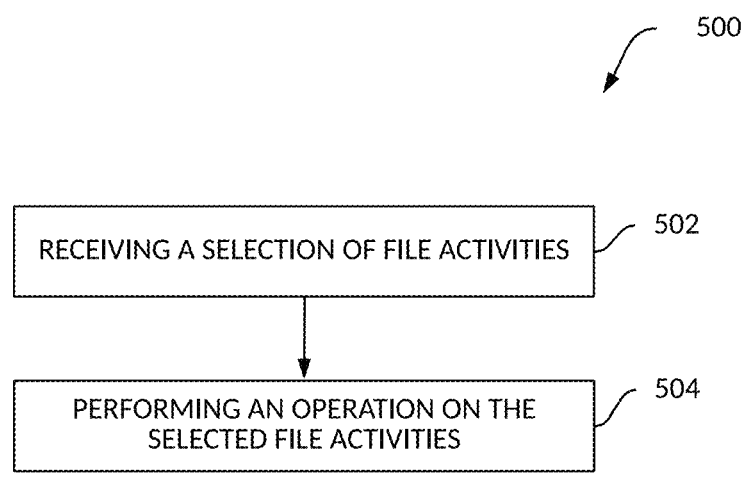
FIG. 5 is a flow diagram of a method for operating on files based on a histogram slider, in accordance with an example embodiment.

FIG. 5 is a flow diagram of a method 500 for operating on files based on a histogram slider, in accordance with an example embodiment. Operations in the method 500 may be performed by the histogram slider application 108, using components (e.g., modules, engines) described above with respect to FIG. 2. Accordingly, the method 500 is described by way of example with reference to the histogram slider application 108. However, it shall be appreciated that at least some of the operations of the method 50X) may be deployed on various other hardware configurations or be performed by similar components residing elsewhere. For example, some of the operations may be performed at the storage system 106.

In operation 502, the GUI module 210 receives a selection (from the user) of file activities on the list of file activities. For example, the user may select one or more file activities identified in the list. In operation 504, the operation module 212 performs an operation on the selected file activities. For example, the operation module 212 deletes the files corresponding to the selected file activities or restores the files corresponding to the selected file activities to a previous version prior to the date identified by the slider.

Figure 6A:
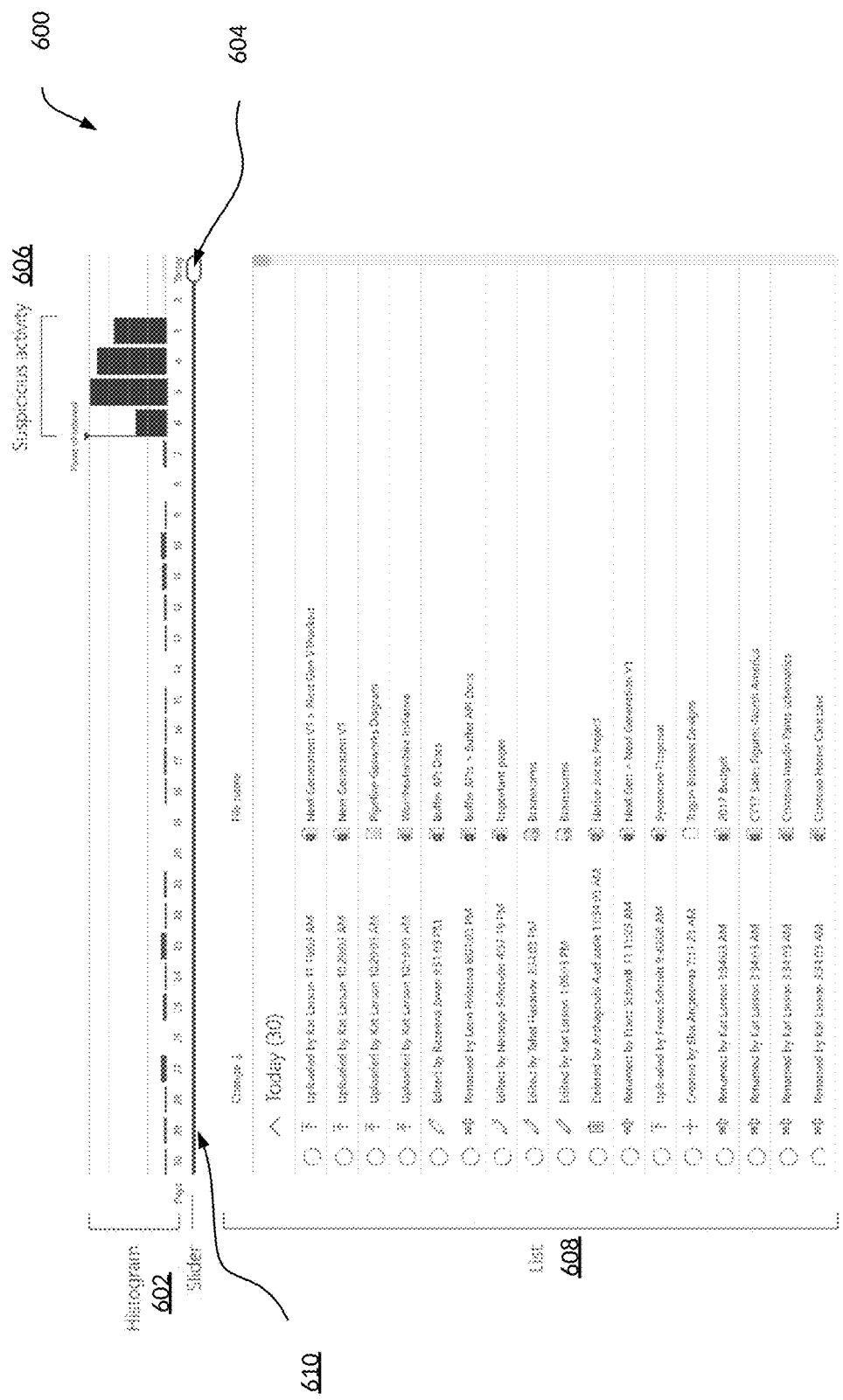
FIG. 6A is an example graphical user interface (GUI) of a histogram slider and corresponding file activities list, in accordance with an example embodiment.

FIG. 6A is an example graphical user interface (GUI) 600 of a histogram slider and corresponding file activities list, in accordance with an example embodiment. The GUI 600 includes a histogram 602, a slider 604 on a timeline 610, and a list 608 of file activities corresponding to the date identified by the slider 604 on the timeline 610. The histogram 602 further comprises an identification of suspicious activities 606.

Figure 6B:
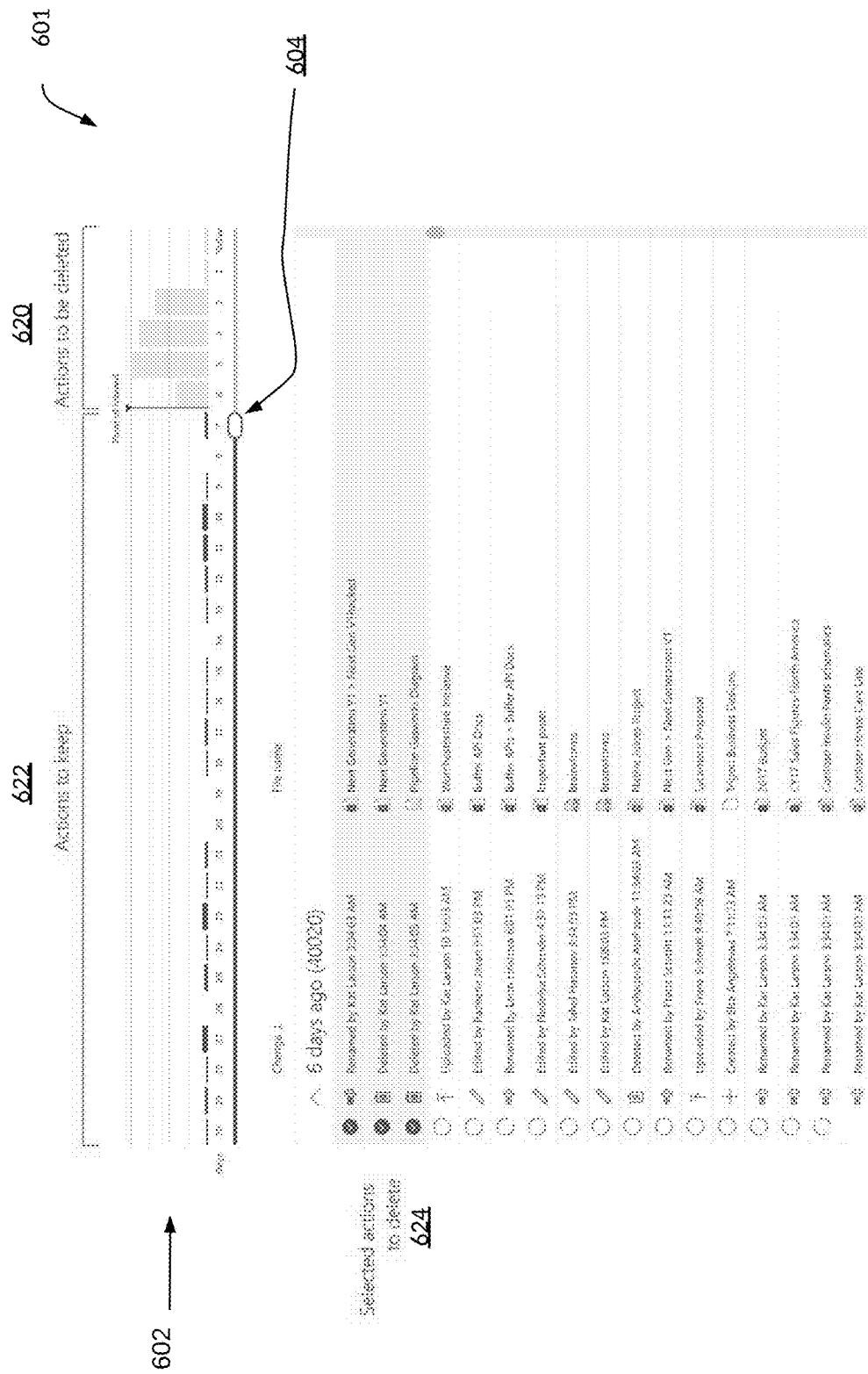
FIG. 6B is an example graphical user interface (GUI) of an updated histogram slider and corresponding file activities list, in accordance with an example embodiment.

FIG. 6B is an example graphical user interface (GUI) 601 of an updated histogram slider and corresponding file activities list, in accordance with an example embodiment. The GUI 601 includes a first portion 622 of the histogram 602, a second portion 620 of the histogram 602, and a selection 624 of items from the list of file activities corresponding to the date identified by the slider 604 on the timeline 610.

Figure 7A:
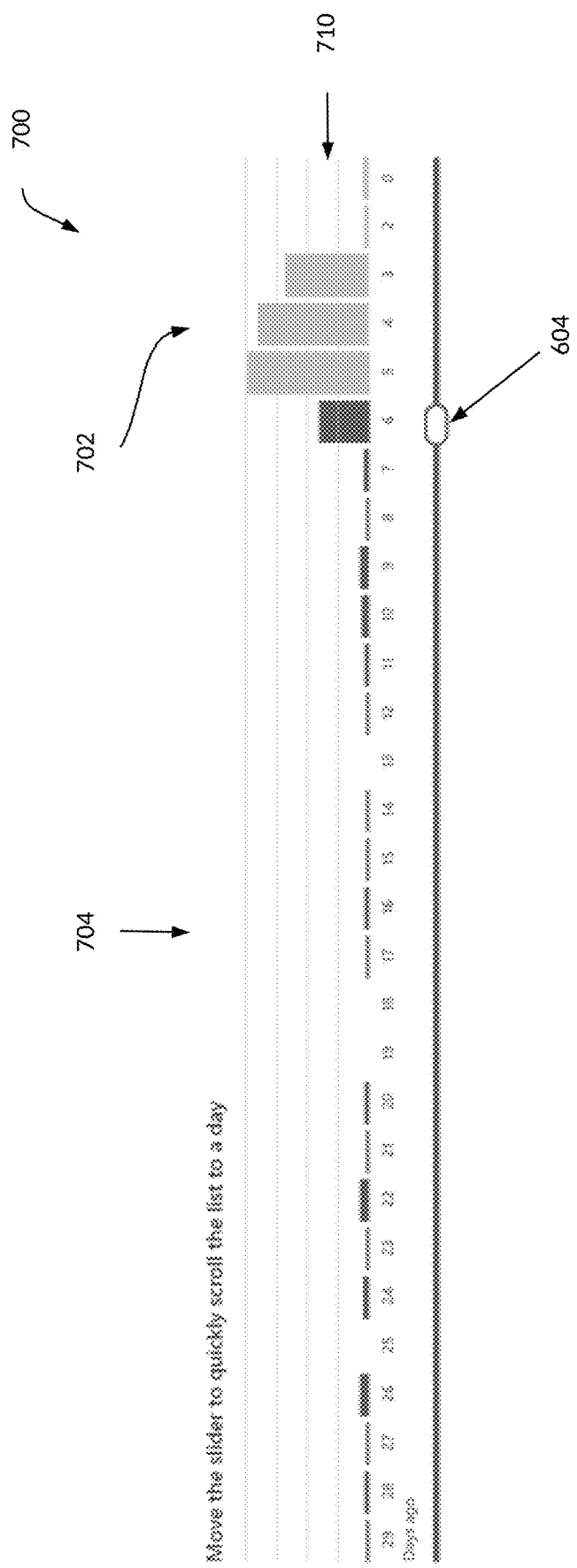
FIG. 7A is an example graphical user interface (GUI) of a histogram slider and activities chart, in accordance with an example embodiment.

FIG. 7A is an example graphical user interface (GUI) 700 of a histogram slider and activities chart, in accordance with an example embodiment. The GUI 700 includes a first portion 704 of a histogram 710, a second portion 702 of the histogram 710, and a slider 604. The first portion 704 is visually distinguishable from the second portion 702. For example, the color of the bar chart in the first portion 704 is darker than the color of the bar chart in the second portion 702.

FIG. 7B is an example graphical user interface (GUI) 701 of an updated histogram slider and activities chart, in accordance with an example embodiment. The color of the bar chart in the histogram 710 is uniform.

Figure 8:
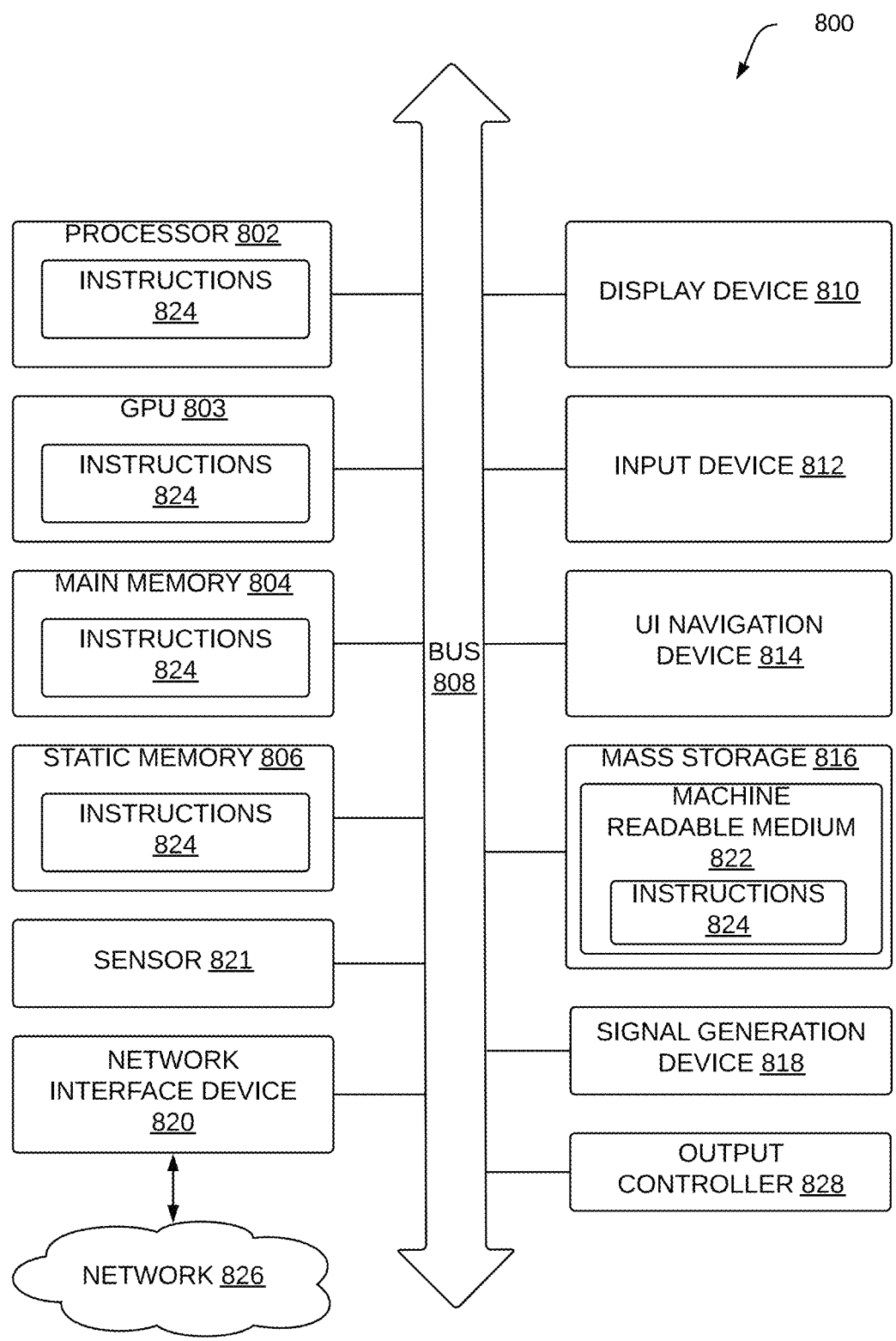
FIG. 8 is a diagrammatic representation of a machine in an example form of a computing system within which a set of instructions may be executed for causing the machine to perform any one or more of the methodologies discussed herein, according to an example embodiment.

FIG. 8 is a block diagram illustrating components of a machine 800, according to some example embodiments, able to read instructions 824 from a machine-storage medium 822 and perform any one or more of the methodologies discussed herein, in whole or in part. Specifically, FIG. 8 shows the machine 800 in the example form of a computer device (e.g., a computer) within which the instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flows and flow diagrams of FIGS. 3-5. The instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, a power adapter, or any machine 800 capable of executing the instructions 824, sequentially or otherwise, that specify actions to be taken by that machine 800. Further, while only a single machine 800 is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU) 803, a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a display device 810 (e.g., a plasma display panel (PDP), a light-emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a user interface (UI) navigation device 814 (e.g., a mouse, a touchpad, a trackball, a joystick, a motion sensor, an eye tracking device, or another pointing instrument), a storage unit 816, a signal generation device 818 (e.g., a sound card, an amplifier, a speaker, a headphone jack, or any suitable combination thereof), a network interface device 820, and one or more sensors 821, such as a Global Positioning System (GPS) sensor, compass, accelerometer, or another sensor. The machine 800 may include an output controller 828, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage unit 816 includes the machine-storage medium 822 on which are stored the instructions 824 embodying any one or more of the methodologies or functions described herein. The instructions 824 may also reside, completely or at least partially, within the processor 802, the GPU 803, the main memory 804, the static memory 806, or the machine-storage medium 822 before or during execution thereof by the machine 800. Accordingly, the main memory 804 and the processor 802 may be considered machine-storage media 822 (e.g., tangible and non-transitory machine-readable media).

In some example embodiments, the machine 800) may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a Global Positioning System (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802, cause various operations to implement the disclosed embodiments.

As used herein, the terms "machine-storage medium," "device-storage medium," and "computer-storage medium" (referred to collectively as "machine-storage medium 822'") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communication network 826 using a transmission medium via the network interface device 820 and utilizing any one of a number of well-known transfer protocols (e.g., Hypertext Transfer Protocol (HTTP)). Examples of communication networks 826 include a LAN, a WAN, the Internet, mobile telephone networks, plain old telephone service (POTS) networks, and wireless data networks (e.g., Wi-Fi, Long-Term Evolution (LTE), and WiMAX networks). The term "transmission medium" or "signal medium" shall be taken to include any intangible medium that is capable of storing, encoding, or carrying the instructions 824 for execution by the machine 800, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 822 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 802 or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data." "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing." "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a computer-implemented method comprising: accessing, from a data storage of a machine, file activities performed on the machine as a function of time; determining points in time at which a level of file activities exceeds an activity level threshold that is based on historical levels of file activities on the machine; generating a graphical user interface comprising a histogram indicative of the file activities over time and the determined points in time, a slider configured to move along a timeline that is parallel to the histogram, and a list of file activities corresponding to a first position of the slider on the timeline, the first position indicating a first time on the histogram; and causing presentation of the graphical user interface at the machine.

In example 2, the subject matter of example 1 can optionally include detecting a second position of the slider on the timeline, the second position indicating a second time on the histogram; and updating the list of file activities based on the second position of the slider on the timeline.

In example 3, the subject matter of example 2 can optionally include receiving a selection of file activities of the updated list of file activities; and performing an operation on the selected file activities.

In example 4, the subject matter of example 3 can optionally include deleting the files corresponding to the selected file activities.

In example 5, the subject matter of example 2 can optionally include the histogram comprising a first portion and a second portion, the second position of the slider forming a boundary between the first portion and the second portion.

In example 6, the subject matter of example 1 can optionally include wherein the histogram comprises a first portion and a second portion, the second portion being visually distinguishable from the first portion.

In example 7, the subject matter of example 1 can optionally include wherein the histogram comprises a first portion and a second portion, the first portion indicating non-suspicious file activities, and the second portion indicating suspicious file activities.

In example 8, the subject matter of example 1 can optionally include wherein the histogram comprises a first portion and a second portion, the second portion comprising the determined points in time of the histogram.

In example 9, the subject matter of example 1 can optionally include determining file activities performed on the machine for each day, wherein determining the points in time comprises determining one or more days on each of which a level of the file activities exceeds a daily activity threshold that is based on historical levels of daily file activities on the machine, wherein the histogram is indicative of the file activities for each day, and the slider is configured to move along the timeline, the first position of the slider indicating a date on the histogram.

In example 10, the subject matter of example 1 can optionally include wherein the graphical user interface comprises a first region, a second region, and a third region, wherein the first region comprises the histogram, wherein the second region comprises the slider and the timeline, wherein the third region comprises the list of file activities corresponding to the first position of the slider on the timeline, the third region being updated based on a user interaction in the second region.

Although an overview of the present subject matter has been described with reference to specific example embodiments, various modifications and changes may be made to these embodiments without departing from the broader scope of embodiments of the present disclosure. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
accessing, from a data storage of a machine, file activities performed on the machine as a function of time;
determining points in time at which a level of file activities exceeds an activity level threshold that is based on historical levels of file activities on the machine;
generating a graphical user interface comprising a histogram indicative of the file activities over time and the determined points in time, a slider configured to move along a timeline that is parallel to the histogram, a list of files and corresponding file activities based on a first position of the slider on the timeline, the first position indicating a first time on the histogram, the histogram visually emphasizing the determined points in time from a remainder of the histogram, the histogram indicating the emphasized determined points in time as suspicious activities, wherein the graphical user interface comprises a first region, a second region, and a third region,
wherein the first region comprises the histogram and indicator that identifies and recommends deleting one or more files activities subsequent to the points in time in the histogram,
wherein the second region comprises the slider and the timeline,
wherein the third region comprises the list of file activities corresponding to the first position of the slider on the timeline, the third region being updated based on a user interaction in the second region; and
causing presentation of the graphical user interface at the machine.

2. The computer-implemented method of claim 1, further comprising:
detecting a second position of the slider on the timeline, the second position indicating a second time on the histogram; and
updating the list of file activities based on the second position of the slider on the timeline.

3. The computer-implemented method of claim 2, further comprising:
receiving a selection of file activities of the updated list of file activities; and
performing an operation on the selected file activities.

4. The computer-implemented method of claim 3, wherein performing the operation further comprises:
deleting files corresponding to the selected file activities.

5. The computer-implemented method of claim 2, wherein the histogram comprises a first portion and a second portion, the second position of the slider forming a boundary between the first portion and the second portion.

6. The computer-implemented method of claim 1, wherein the histogram comprises a first portion and a second portion, the second portion being visually distinguishable from the first portion.

7. The computer-implemented method of claim 1, wherein the histogram comprises a first portion and a second portion, the first portion indicating non-suspicious file activities, and the second portion indicating suspicious file activities.

8. The computer-implemented method of claim 1, wherein the histogram comprises a first portion and a second portion, the second portion comprising the determined points in time of the histogram.

9. The computer-implemented method of claim 1, further comprising:
   determining file activities performed on the machine for each day, wherein determining the points in time comprises determining one or more days on which a level of the file activities exceeds a daily activity threshold that is based on historical levels of daily file activities on the machine,
   wherein the histogram is indicative of the file activities for each day of the one or more days, the first position of the slider indicating a date on the histogram.

10. A system comprising:
    one or more hardware processors; and
    a memory storing instructions that, when executed by the one or more hardware processors, cause the one or more hardware processors to perform operations comprising:
    accessing, from a data storage of a machine, file activities performed on the machine as a function of time;
    determining points in time at which a level of file activities exceeds an activity level threshold that is based on historical levels of file activities on the machine;
    generating a graphical user interface comprising a histogram indicative of the file activities over time and the determined points in time, a slider configured to move along a timeline that is parallel to the histogram, and a list of files and corresponding file activities based on a first position of the slider on the timeline, the first position indicating a first time on the histogram, the histogram visually emphasizing the determined points in time from a remainder of the histogram, the histogram indicating the emphasized determined points in time as suspicious activities, wherein the graphical user interface comprises a first region, a second region, and a third region,
    wherein the first region comprises the histogram and indicator that identifies and recommends deleting one or more files activities subsequent to the points in time in the histogram,
    wherein the second region comprises the slider and the timeline,
    wherein the third region comprises the list of file activities corresponding to the first position of the slider on the timeline, the third region being updated based on a user interaction in the second region; and
    causing presentation of the graphical user interface at the machine.

11. The system of claim 10, wherein the operations further comprise:
    detecting a second position of the slider on the timeline, the second position indicating a second time on the histogram; and
    updating the list of file activities based on the second position of the slider on the timeline.

12. The system of claim 11, wherein the operations further comprise:
    receiving a selection of file activities of the updated list of file activities; and
    performing an operation on the selected file activities.

13. The system of claim 12, wherein performing the operation further comprises:
    deleting files corresponding to the selected file activities.

14. The system of claim 11, wherein the histogram comprises a first portion and a second portion, the second position of the slider forming a boundary between the first portion and the second portion.

15. The system of claim 10, wherein the histogram comprises a first portion and a second portion, the second portion being visually distinguishable from the first portion.

16. The system of claim 10, wherein the histogram comprises a first portion and a second portion, the first portion indicating non-suspicious file activities, and the second portion indicating suspicious file activities.

17. The system of claim 10, wherein the operations further comprise:
    determining file activities performed on the machine for each day, wherein determining the points in time comprises determining one or more days on which a level of the file activities exceeds a daily activity threshold that is based on historical levels of daily file activities on the machine,
    wherein the histogram is indicative of the file activities for each day of the one or more days, and the slider is configured to move along the timeline, the first position of the slider indicating a date on the histogram.

18. A machine-storage medium storing instructions that, when executed by one or more processors of a machine, cause the one or more processors to perform operations comprising:
    accessing, from a data storage of the machine, file activities performed on the machine as a function of time;
    determining points in time at which a level of file activities exceeds an activity level threshold that is based on historical levels of file activities on the machine;
    generating a graphical user interface comprising a histogram indicative of the file activities over time and the determined points in time, a slider configured to move along a timeline that is parallel to the histogram, and a list of files and corresponding file activities based on a first position of the slider on the timeline, the first position indicating a first time on the histogram, the histogram visually emphasizing the determined points in time from a remainder of the histogram, the histogram indicating the emphasized determined points in time as suspicious activities, wherein the graphical user interface comprises a first region, a second region, and a third region,
    wherein the first region comprises the histogram and indicator that identifies and recommends deleting one or more files activities subsequent to the points in time in the histogram,
    wherein the second region comprises the slider and the timeline,
    wherein the third region comprises the list of file activities corresponding to the first position of the slider on the timeline, the third region being updated based on a user interaction in the second region; and
    causing presentation of the graphical user interface at the machine.

* * * * *